Feb. 11, 1964   A. R. WALTZ   3,120,890
HOPPER APPARATUS FOR ALIGNING OBJECTS THEREIN
Filed Aug. 28, 1961   3 Sheets-Sheet 1

Albert Richard Waltz,
INVENTOR.

BY.

ATTORNEY.

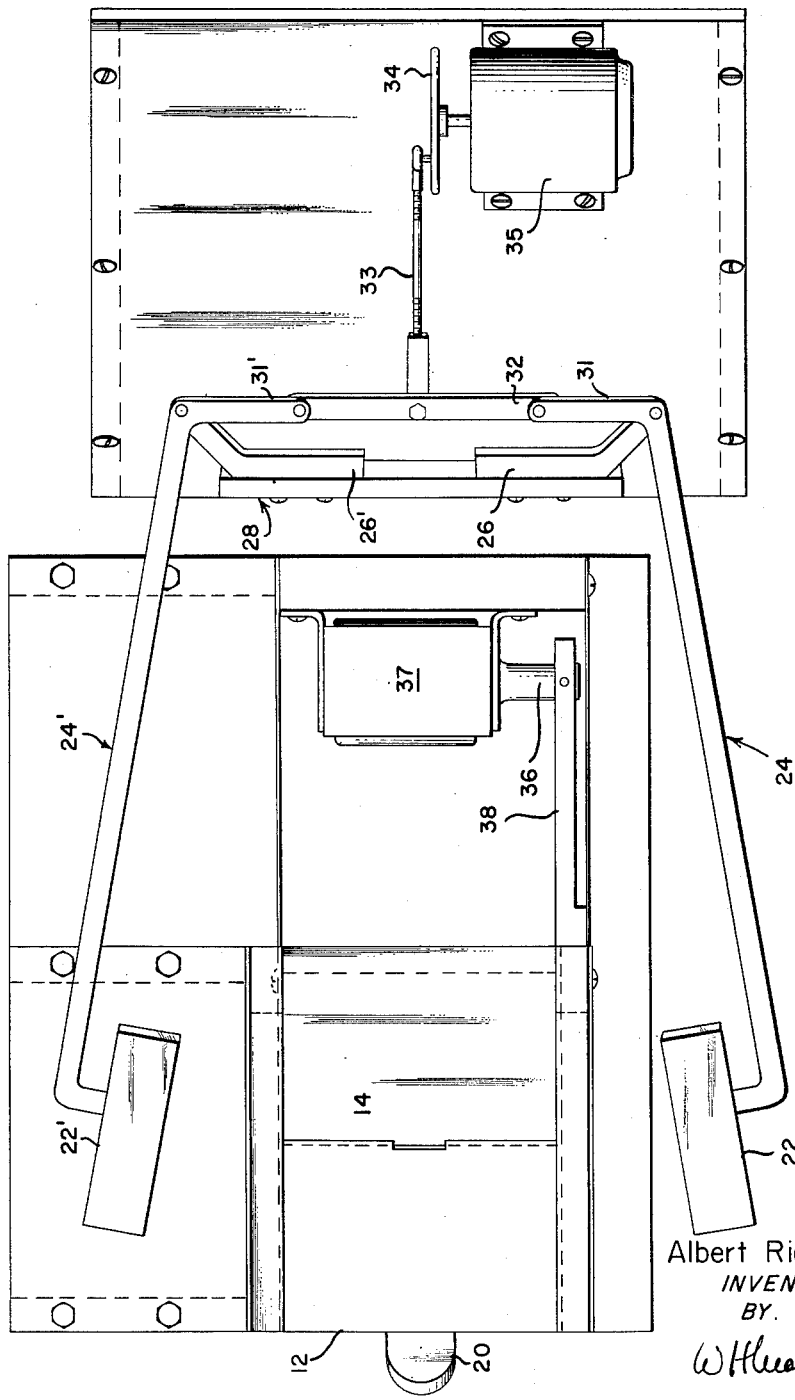

Feb. 11, 1964   A. R. WALTZ   3,120,890
HOPPER APPARATUS FOR ALIGNING OBJECTS THEREIN
Filed Aug. 28, 1961   3 Sheets-Sheet 3
Fig. 3.
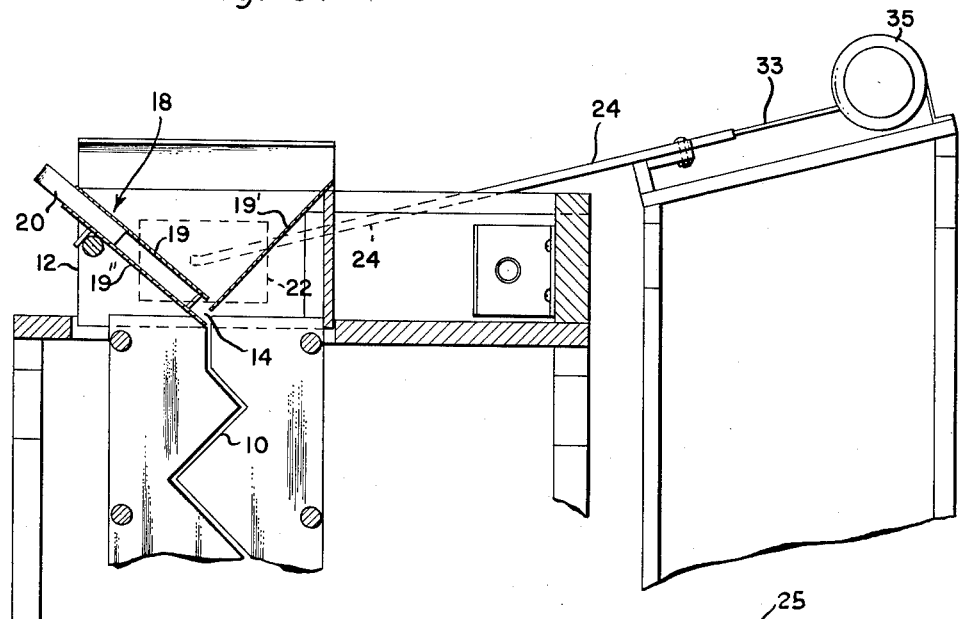
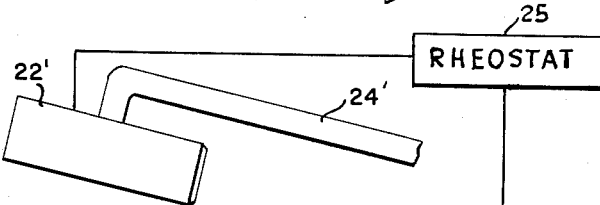
Fig. 4.
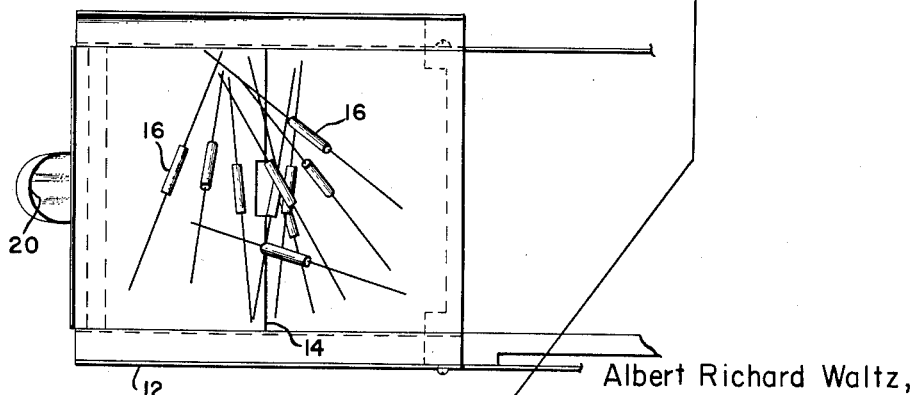
Albert Richard Waltz,
*INVENTOR.*
BY
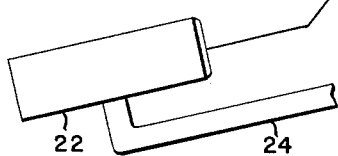

United States Patent Office 3,120,890
Patented Feb. 11, 1964

3,120,890
HOPPER APPARATUS FOR ALIGNING
OBJECTS THEREIN
Albert R. Waltz, Fullerton, Calif., assignor to Hughes Aircraft Company, Culver City, Calif., a corporation of Delaware
Filed Aug. 28, 1961, Ser. No. 134,228
5 Claims. (Cl. 198—33)

This invention relates to apparatus for physically organizing and orienting randomly positioned objects and articles into a predetermined and well-ordered arrangement. More particularly, but not necessarily exclusively, the invention relates to apparatus for rearranging semiconductor devices from a disorganized disposition to a predetermined physical organization so that the devices may be quickly and uniformly presented to one or more work stations for the accurate performance of a predetermined operation thereon.

It will be appreciated that certain semiconductor devices such as diodes must at several stages in their assembly and fabrication be physically arranged in a uniform manner so that a particular operation may be performed rapidly and uniformly on each device. Thus, for example, it is desirable to paint diodes of like electrical characteristics according to a predetermined color code. In addition, it is sometimes desirable to mount the finished devices in belt-like fashion on adhesive tape or like as described in U.S. Patent No. 2,915,212 assigned to the instant assignee. P. B. Cason in U.S. Patent No. 2,975,878, also assigned to the present assignee, describes apparatus which, by means of a chute, physically arranges diodes and the like in accordance with their electrical characteristics. In Cason's patented apparatus the semiconductor devices are presented to his orientation chute or track from a hopper in which the devices are dumped in a completely random fashion, it being necessary to vibrate the hopper in order that the devices may be brought into alignment with the opening in the bottom of the hopper so that they may drop therethrough and enter the aforesaid chute or track. While hopper vibration facilitates such alignment, it is generally necessary for an operator to manually assist in the alignment from time to time particularly with respect to devices which are quite extremely out of position. It has been found that feeding of devices from the hopper is an extremely slow and tedious process and in fact is truly a "bottleneck" since from this point on the work station apparatus is designed to and can operate accurately on the devices at a rate far in excess of the hopper discharge rate.

It is therefore an object of the present invention to provide an improved apparatus for aligning objects into a predetermined uniform arrangement from an initial random disposition.

Another object of the invention is to provide an improved apparatus in which objects may be loaded in random fashion and arranged and discharged in a predetermined and ordered fashion.

These and other objects and advantages of the invention are realized by providing a hopper or bin for objects capable of reacting physically to the presence of magnetic forces with magnetic field-producing means. The objects are thus caused to align themselves in response to magnetic forces so as to be in general alignment or parallel with the discharge opening or slit in the bottom of the hopper. The hopper may also be vibrated mechanically to facilitate discharge therefrom.

The invention will be described in greater detail by reference to the drawings in which:

FIGURE 2 is a plan view of this embodiment of the invention showing the hopper, the magnetic alignment elements, mechanical vibrating means for the hopper, and driving means for the magnetic elements;

FIGURE 3 is an elevational view, partly in section, of the embodiment of the invention shown in FIGURE 1 showing in particular the hopper, the discharge opening therein, and the chute or track arrangement fed therefrom, as well as the driving means for the magnetic alignment elements, and the hopper vibrating means;

FIGURE 4 is a plan view of the hopper with a number of randomly disposed diode devices therein just prior to being acted upon by magnetic forces to bring them into alignment;

Figure 1:
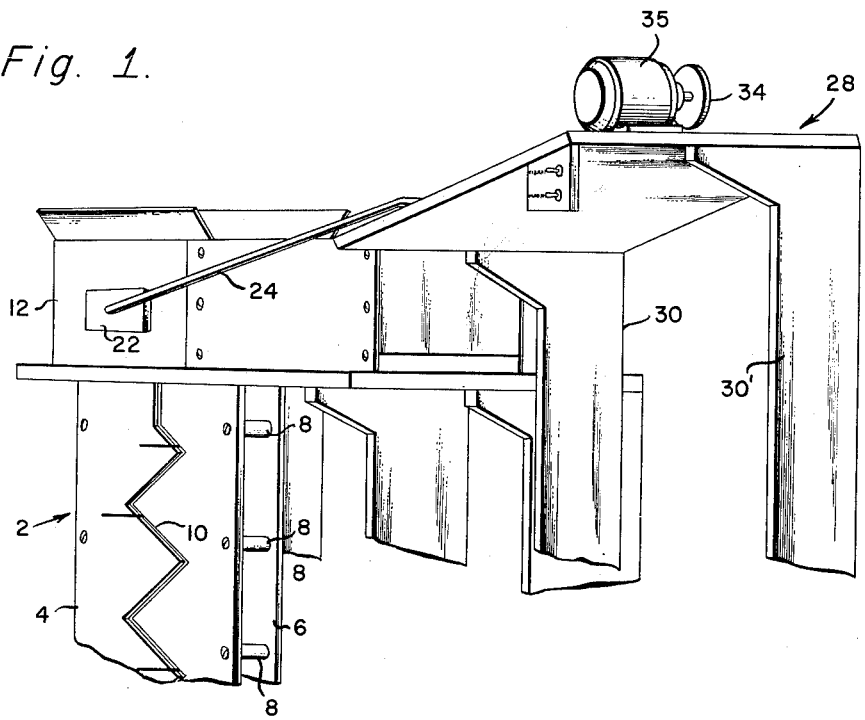
FIGURE 1 is a perspective view of apparatus embodying the invention, showing the hopper or bin, the chute or track apparatus to be fed thereby, magnetic alignment elements and driving means therefor.

Referring now to the drawings and to FIGURE 1 in particular to describe, in greater detail, apparatus embodying the invention, a typical installation includes a chute or track-containing member 2 formed by a pair of parallel plates 4 and 6 secured together in spaced relationship by means of sleeved bolts identified generally by reference numeral 8. The chute member 2 may be arranged, for example, to feed devices such as semiconductor diodes from the track 10 to a bolt for transport to and through a paint-striping machine (not shown). Positioned on top of the chute member 2 is a hopper 12 in the form essentially of a rectangular, open-top box having a discharge slot 14 in the bottom thereof arranged and disposed to discharge objects from the hopper and into the track 10. The hopper and its features may be more easily understood by reference to FIGURES 2 and 3. The hopper arrangement shown in this embodiment of the invention is particularly designed for feeding semiconductor diodes of the kind comprising a substantially tubular envelope having coaxially disposed leads extending from the ends thereof. Such diodes are shown and generally identified by reference numerals 16 in FIGURES 4 and 5. With particular reference to FIGURE 3, the hopper 12 contains a trough 18 formed by pair of inwardly and downwardly slanted plates 19 and 19'. One side of the trough 18 is movable and for this purpose includes an additional plate 19'' parallel to and beneath the top plate 19, the two plates 19 and 19'' being secured to a mounting plate 20 which also serves as a handle therefor. The movable side of the trough 18 is thus adjustable with respect to the other side so as to permit the establishment of correct and precise slot clearances at the bottom of the trough for the proper feeding of aligned diodes therethrough one at a time.

In order to establish magnetic forces in the hopper 12, a pair of opposed magnetic alignment elements 22 and 22' are disposed outside the hopper and adjacent to opopsed sides thereof. The magnetic alignment elements 22 and 22' are so arranged that the lines of force of the magnetic fields established thereby will cause magnetically attractable objects in the hopper 12 to align themselves in response thereto in such a manner that they are in alignment with the discharge slot 14 in the bottom of the hopper. It should be understood that the term "magnetic alignment elements" is intended to generically include both permanent magnetic devices as well as electromagnetic or other semi-permanent magnetic means. In addition, the objects to be acted upon by the magnetic forces established by these magnetic means are referred to herein as "magnetic" for convenience, it being understood that the objects may not be magnetic themselves but only in whole or in part attractable to or influenced by magnetic forces.

The magnetic alignment elements 22, 22' are mounted on and support in position adjacent the hopper 12 by support arms 24 and 24', respectively. As shown best in FIGURE 2 the support arms 24, 24' are pivotedly mounted on support brackets or plates 26 and 26', respectively, and adapted for movement inwardly toward and outwardly away from the hopper 12. The pivot support brackets 26, 26' are in turn mounted on a frame structure designated generally by reference numeral 28 which structure may in turn be supported by upright members 30 and 30'. At the point of pivotal attachment of the support arms 24, 24' to the brackets 26, 26', the support arms are angled so that their free ends 31 and 31' extend toward each other along a line substantially parallel to the line of reciprocating movement of the opposite ends which carry the magnetic alignment elements 22, 22'. The angled ends 31 and 31' are movably or pivotedly secured to the opposite ends of a drawbar 32 which in turn is secured at its center to a driverod 33. It will thus be understood that by pushing the driverod 33 back and forth, the drawbar 32 will be moved therewith so as to cause the angled ends 31 and 31' of the support arms to pivot in a clockwise or counterclockwise direction around their respective pivot points whereby the opposite ends of the support arms are likewise moved. The driverod 33 is eccentrically secured to a drive-wheel 34 mounted on the shaft of an electric motor 35 whereby a reciprocal movement is imparted to the driverod 33 and hence to the support arm assembly as described. This arrangement is only exemplary, there being numerous other satisfactory arrangements which could be employed for the same purpose. The arrangement described and shown will cause the magnetic alignment elements 22, 22' to move in and toward and then out and away from each other and the hopper 12 so as to establish alternately increasing and decreasing magnetic forces in the hopper 12.

Figure 5:
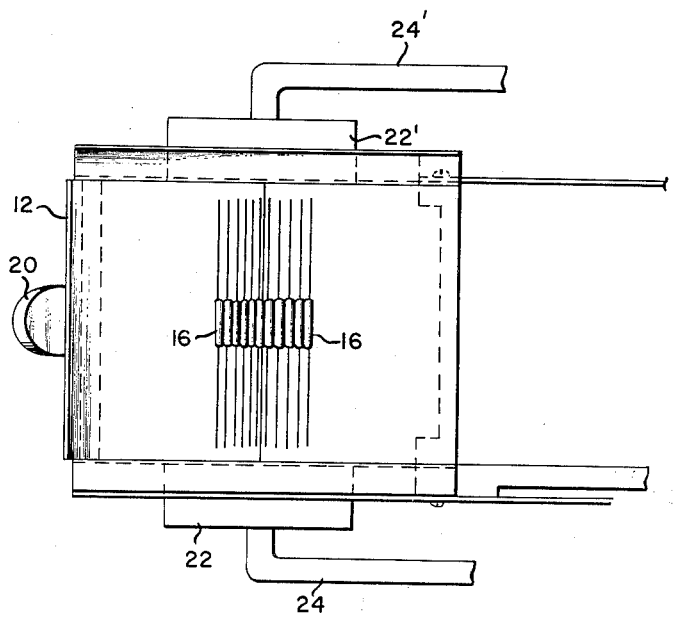
FIGURE 5 is a plan view of the hopper with a number of diode devices therein having been acted upon by magnetic forces to bring them into alignment with the discharge slot in the bottom of the hopper.

In operation, a number of diodes for example may be dumped into the hopper in a random manner such as depicted in FIGURE 4. Upon energizing the magnetic alignment element driving motor 35, the support arms 24 and 24' will commence their reciprocating movement toward and away from the hopper. At the point of closest approach to the hopper, the magnetic alignment elements 22, 22' will subject the randomly disposed diodes to the maximum magnetic forces, and the diodes, due to their magnetically attractable leads, will be raised and supported in and by these magnetic forces, as shown in FIGURE 5. At the same time the diodes will align themselves in response to the magnetic lines of force so that the diodes will be disposed with their principal axis extending substantially across the hopper and parallel to the discharge slot 14 in the bottom thereof. As the magnetic alignment elements recede from the hopper, the magnetic forces decrease and ultimately reach a minimum value on this portion of the cycle. The decreasing magnetic forces thus permit the aligned diodes to slowly drop and rest on the bottom of the hopper trough 18 from when the diodes can be discharged by gravity through the slot 14 into the track 10.

In order to facilitate and enhance discharging the diodes through the slot 14 in the bottom of the hopper 12, the hopper may be mechanically vibrated. Such vibration may be achieved by connecting the shaft 36 of an electrical vibrator 37 to a vibratory driving rod or plate 38 which is eccentrically mounted on the vibrator shaft 36, the driving plate 38 in turn having its other end secured to the hopper 12 (i.e., one of the walls or the base thereof). Such an arrangement will impart a shaking and settling motion to the hopper and the diodes therein.

There thus has been described a new and improved apparatus for orienting and discharging random-loaded objects from a container hopper rapidly and uniformly. It will be understood that many alternatives to the embodiment and arrangements shown and described herein are possible without departing from the spirit and scope of the appended claims.

Thus for example electromagnets may be mounted on the sides of the hopper and the energy thereto for establishing the desired magnetic forces may be varied cyclically to establish magnetic forces of increasing and decreasing strength thus obviating the need for mechanically-driven or moving parts. One example of such a device is illustrated in FIG. 4. If 22 and 22' are electromagnets, a device such as a rheostat 25 may be used for applying cyclically varying energy to the electromagnets.

What is claimed is:

1. In combination, a hopper for receiving randomly-disposed objects in bulk and having an elongated slot in the bottom thereof for discharging said objects in a predetermined order and disposition from said hopper, transversely movable magnetic alignment means positioned at the sides of said hopper and above said slot to align objects in said hopper with said discharge slot by establishing magnetic forces of varying intensity in said hopper, and means for moving said magnetic alignment means toward and away from the sides of said hopper.

2. In combination, a hopper for receiving randomly-disposed objects in bulk and having an elongated slot in the bottom thereof for discharging said objects in a predetermined order and disposition from said hopper, transversely movable magnetic alignment means positioned at the sides of said hopper and above said discharge slot to align objects in said hopper with said discharge slot therein, means for moving said magnetic alignment means, and means for vibrating said hopper.

3. In combination, a hopper for receiving randomly-disposed objects in bulk and having a slot in the bottom thereof for discharging said objects in a predetermined order and disposition from said hopper, electromagnetic alignment means positioned at the sides of said hopper for establishing magnetic forces of varying intensity above said discharge slot to align objects in said hopper with said discharge slot therein, means coupled to said electromagnetic alignment means for varying the intensity of the magnetic field established by said electromagnetic alignment means in said hopper, and means for vibrating said hopper.

4. In combination, a hopper for receiving randomly-disposed objects in bulk and having an elongated opening in the bottom thereof for discharging said objects in a predetermined order and disposition, electromagnetic elements positioned at the sides of said hopper, means coupled to said electromagnetic elements for establishing magnetic forces of varying intensity above said elongated opening to thereby align objects in said hopper with said elongated opening.

5. In combination, a hopper for receiving randomly-disposed objects in bulk and having an elongated opening in the bottom thereof for discharging said objects in a predetermined order and disposition, transversely movable magnetic elements positioned at the sides of said hopper for establishing magnetic forces above said elongated opening in the bottom of said hopper to thereby align objects therein with said elongated opening.

References Cited in the file of this patent

UNITED STATES PATENTS

| Re. 14,290 | Gamper | Apr. 24, 1917 |
| 833,761 | Stevens | Oct. 23, 1906 |
| 1,053,209 | Neumann | Feb. 18, 1913 |
| 1,080,435 | Gamper | Dec. 2, 1913 |
| 2,975,878 | Cason | Mar. 21, 1961 |